United States Patent [19]

Sugimura

[11] Patent Number: 4,732,176
[45] Date of Patent: Mar. 22, 1988

[54] ISOLATING MEMBER IN AN IN-LINE TYPE ACCUMULATOR

[76] Inventor: Nobuyuki Sugimura, 308, Mabase, Shimizu-shi, Shizuoka-ken, Japan

[21] Appl. No.: 22,544

[22] Filed: Mar. 3, 1987

Related U.S. Application Data

[63] Continuation of Ser. No. 857,500, Apr. 30, 1986, abandoned.

[30] Foreign Application Priority Data

Aug. 6, 1985 [JP] Japan .................. 60-120345[U]
Aug. 29, 1985 [JP] Japan .................. 60-131935[U]

[51] Int. Cl.⁴ .................................................. F16L 55/04
[52] U.S. Cl. ........................................................ 138/30
[58] Field of Search ................ 138/26, 30; 220/85 B

[56] References Cited

U.S. PATENT DOCUMENTS

| | | | |
|---|---|---|---|
| 3,063,470 | 11/1962 | Forster | 138/30 |
| 3,331,399 | 7/1967 | Von Forell | 138/30 |
| 3,473,565 | 10/1969 | Blendermann | 138/30 |
| 4,186,775 | 2/1980 | Muroi | 138/26 |

FOREIGN PATENT DOCUMENTS 1133496 11/1968 United Kingdom ................. 138/26

*Primary Examiner*—Henry J. Recla
*Assistant Examiner*—L. J. Peters
*Attorney, Agent, or Firm*—Wood, Dalton, Phillips, Mason & Rowe

[57] ABSTRACT

In an in-line type accumulator of the type that on the inside of a pressure vessel there are provided a cylindrical isolating member and an inner tube having communication holes in succession in a concentric manner, a diameter of a central portion of the isolating member is made larger than a diameter of the portions on the opposite sides of the central portion, and thereby constricted portions having a U-shaped longitudinal cross-section are formed on the opposite sides of the central portion.

4 Claims, 10 Drawing Figures

ISOLATING MEMBER IN AN IN-LINE TYPE ACCUMULATOR

This application is a continuation of application Ser. No. 857,500, filed 4/30/86 now abandoned.

FIELD OF THE INVENTION

The present invention relates to an in-line type accumulator for preventing noises and pulsations in a hydraulic system, and more particularly, to an isolating member within an in-line type accumulator.

BACKGROUND OF THE INVENTION

In-line type accumulators eliminate noise and vibration caused by pressure variations in pipe systems used to convey pressurized liquids. The center of the accumulator resembles a pipe section called an inner tube which is connected in series with the liquid conveying system. Liquid which passes through this inner tube has access to a surrounding liquid chamber via a number of passages in the wall of the inner tube. This liquid chamber is separated from a gas chamber by a flexible bladder called an isolating member. Pressure variations occurring within the pipe system cause liquid to flow through the passages in the wall of the inner tube, causing the liquid chamber to expand or contract against the isolating member until the pressure inside the liquid chamber equals the pressure inside the gas chamber. The effect is to mitigate changes in pressure within the pipe system and to eliminate noise and vibration caused therefrom.

A heretofore known in-line type accumulator is shown in FIG. 9. A large number of communication holes 2 are drilled in the circumferential wall of an inner tube 1. Three to four axially directed guide frames 4 are provided in a liquid chamber 3 outside of the inner tube 1. Between the outside of the guide frames 4 and a pressure vessel 5 are provided a cylindrical isolating member 6 made of an elastic material such as rubber or the like and flange portions 14 at both ends of isolating member 6. Each flange portion is clamped between pressure vessel 5, a bladder cap 7 and a side plate 8 in order to fixedly secure isolating member 6. The gas chamber 9 outside isolating member 6 and the liquid chamber 3 inside isolating member 6 are thereby isolated from each other. At the inside ends of the bladder caps 7 are provided protectors 11 to prevent the end portions of isolating member 6 from becoming acutely deformed during contraction.

This in-line type accumulator is designed so that isolating member 6 experiences very little stretching. This means that the transverse cross-sectional circumference of isolating member 6 in its natural configuration is nearly equal to its transverse cross-sectional peripheral length in its deformed configuration during contraction, as supported by the outer surfaces of inner tube 1 and guide frames 4. The purpose of this design is to minimize tensile stress experienced by isolating member 6, thereby reducing fatigue and ultimate failure.

Liquid enters the accumulator of FIG. 9 through inlet 12. A wire net cylinder 13 prevents isolating member 6 from entering the communication holes 2.

When the isolating member 6 contracts, its central portion folds regularly over the guide frame 4 causing its transverse cross-section to take a star shape. This prevents fatigue failure in the central portion. Since groove sections 15 are present at both ends of the cylindrical central portion, contraction of the isolating member 6 will cause deformation strains such as bending and stretching to occur at both ends. Hence, each time the isolating member 6 contracts, irregular and acute creases arise at these end portions, eventually causing damage and rupture (See Japanese Pat. No. 909648).

SUMMARY OF THE INVENTION

The present invention aims at preventing the rupture and damage of isolating members of the prior art caused by local fatigue.

According to one feature of the invention, there is provided an improved isolating member in an in-line type accumulator of the type which includes a pressure vessel containing a cylindrical isolating member concentric with an inner tube having communication holes, such that the diameter of the central portion of the isolating member is larger than the diameters of constricted portions surrounding both ends of the guide frames and the protectors.

The isolating member disposed in the in-line type accumulator has an approximately cylindrical shape whose central portion extends along the central portions of the guide frames and whose constricted portions on both sides of the central portion extend along the surfaces of groove sections formed by the guide frames and the protectors.

When a liquid flows into or out of the liquid chamber through the communication holes in response to hydraulic pressure variations, the isolating member will expand or contract in the radial direction without being subjected to deformation strain such as stretching and bending at the end portions.

Upon contraction in the isolating member, the central portion takes a star-shaped transverse cross-section as supported by the guide frames.

DESCRIPTION OF THE PREFERRED EMBODIMENTS

Figure 1:
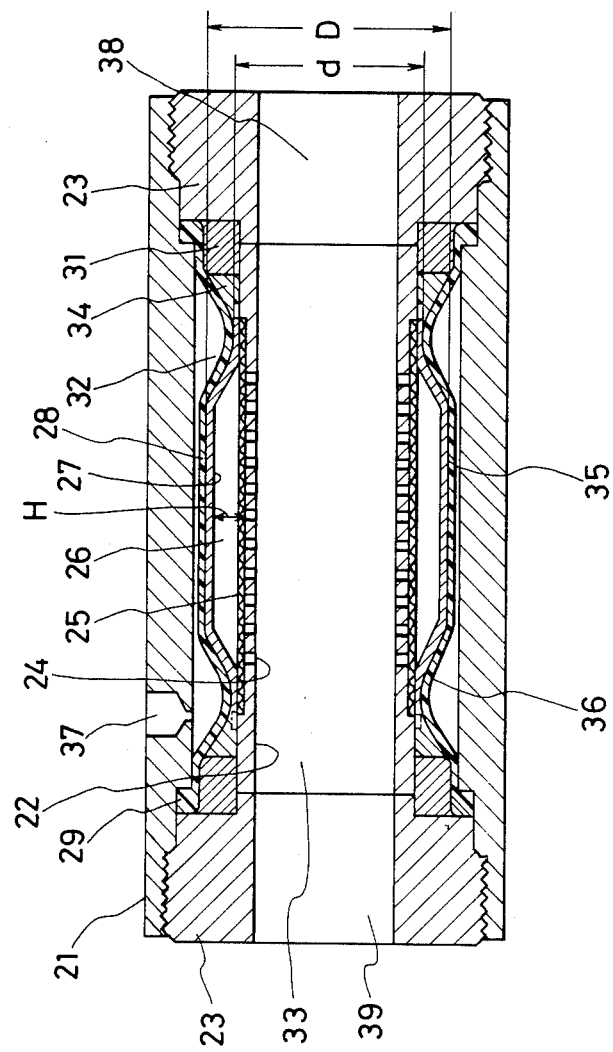
FIG. 1 is a longitudinal cross-sectional view showing one preferred embodiment of the present invention.

One preferred embodiment of the present invention will be explained with reference to FIG. 1

In an in-line accumulator, an inner tube 22 is supported within a pressure vessel 21 at its opposite ends by means of side plates 23 and bladder caps 31. Around the inner tube 22 are drilled in large number of circular communication holes 24. Outside of the inner tube 22 is disposed a wire net cylinder 25 formed by weaving steel wires (besides the superposed wire net, slits could be employed).

Outside of the wire net cylinder 25 is provided a liquid chamber 26. Guide frames 27 are provided apart from the wire net cylinder 25 by an interval H. Both ends of guide frames 27 are secured to the above-mentioned inner tube 22. In order to suppress fatigue of the material of the isolating member 28 during contraction, these guide frames 27 serve to minimize change of the peripheral cross-sectional length of the isolating member 28 and to prevent formation of intersecting irregular creases.

The isolating member 28 is disposed between the outside of the guide frames 27 and the pressure vessel 21. Isolating member 28 is made of elastic material such as rubber and is cylindrical except for constricted portions 36 in the proximities of both ends. Flange sections 29 at both ends are clamped by the pressure vessel 21, the side plates 23 and the bladder caps 31. Isolating member 28 serves to isolate a gas chamber 32 on the outside from the liquid chamber 26 on the inside of the isolating member.

At the inside ends of bladder caps 31 are provided protectors 34 having slant surface portions to prevent isolating member 28 from deforming acutely at these portions upon contraction.

The isolating member 28 is composed of flange sections 29 at both ends, a straight cylindrical central portion 35, and constricted portions 36 formed between the central portion 35 and the respective flange sections 29. Inner diameter D of the central portion 35 is larger than inner diameter d of the constricted portions 36. Constricted portions 36 bend along the slant portions of the guide frames 27 and the slant portions of the protectors 34, and the longitudinal cross-section of the constricted portion 36 depicts nearly a U-shape.

In the pressure vessel 21 is drilled a gas feed port 37. A pressurized gas at a predetermined pressure is fed into the above-described gas chamber 32 through this gas feed port 37. A liquid flowing into and out of passageway 33 through inlet 38 and outlet 39 in the respective side plates 23 enters liquid chamber 26 through communication holes 24 in inner tube 22. The pressures in gas chamber 32 and liquid chamber 26 remain in balance with each other so that when the pressure of the liquid within liquid chamber 26 changes, the gas within gas chamber 32 will expand or contract to bring isolating member 28 close to the side of pressure vessel 21 or close to the side of wire net cylinder 25.

If the pressure of the liquid reaches the limit of lowering, central portion 35 of isolating member 28 has its transverse cross-section deformed into a star-shape as supported by guide frames 27. Constricted portions 36 contact the slant portions of guide frames 27 and the slant portions of protectors 34, taking a configuration close to the natural shape. Therefore, creases are not created in constricted portions 36.

If the pressure of the liquid reaches the limit of rise, the entire isolating member takes a configuration approximating its natural state, meaning that state existing when said isolating member is not subjected to any deforming load. Accordingly, a transverse cross-section at any portion of isolating member 28 becomes circular.

As described above, in the proximities of constricted portion 36 and flange section 29, deformation strain such as stretching and bending will not be concentrated.

Since the diameter of central portion of the isolating member is larger than the diameter of the constricted portions on both sides of the central portion, the isolating member disposed in the in-line type accumulator takes a configuration along the lines formed by the guide frames and the protectors.

Since a large gap space is not present between the lines formed by the guide frames and the protectors as is the case with prior art in-line type accumulators, deformation strain will not be concentrated in the proximity of the flange section of the isolating member.

In this way, the present invention avoids the rupturing of the isolating member in the proximity of the flange sections.

The present invention has been described above in connection with the preferred embodiment illustrated in FIG. 1 However, this invention is not limited to that preferred embodiment, but can be practiced with modification and addition to the illustrated embodiment within the spirit of the invention.

Figure 2:
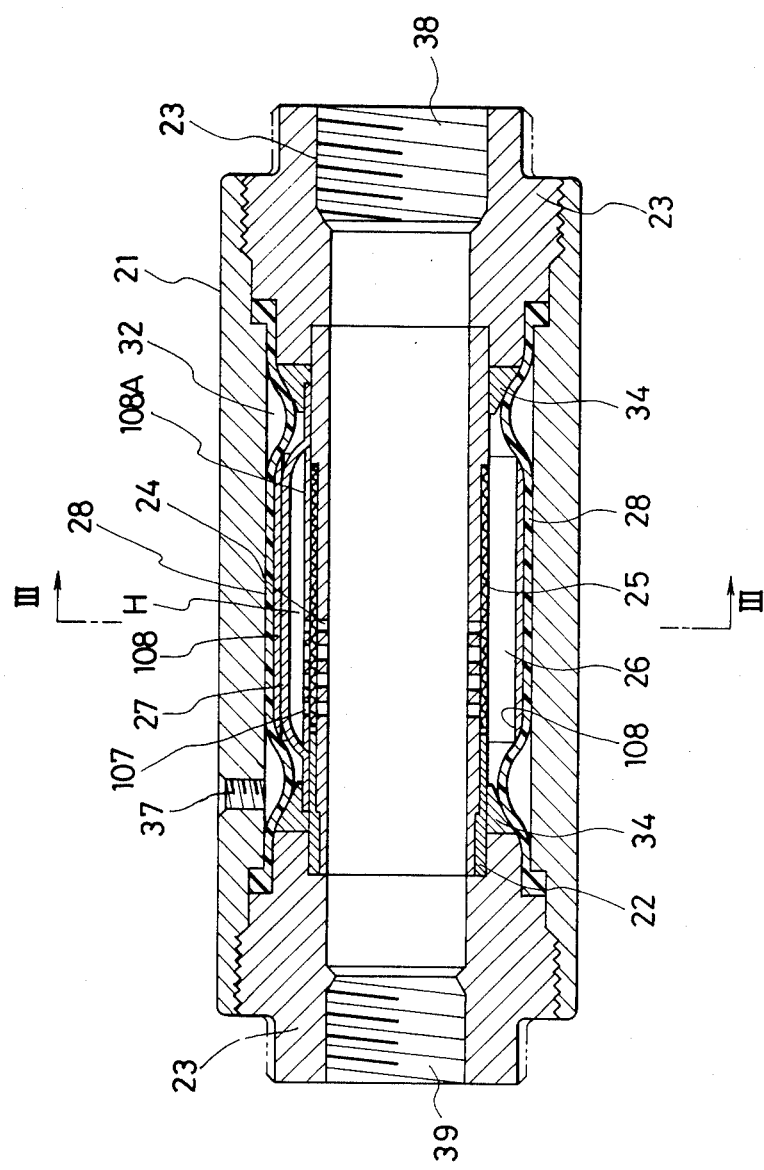
FIG. 2 is a longitudinal cross-sectional view showing another preferred embodiment of the present invention.
Figure 3:
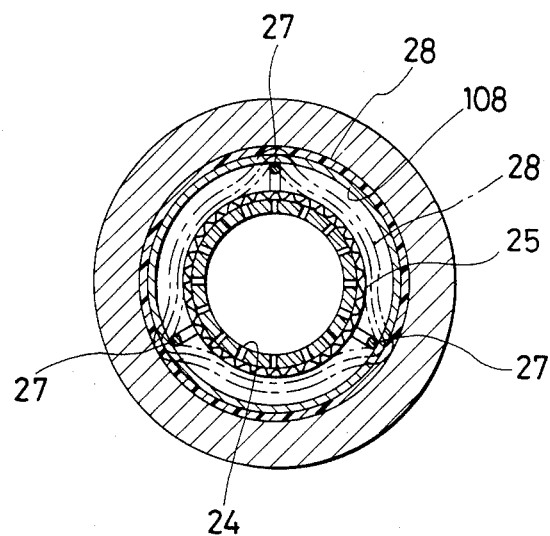
FIG. 3 is a transverse cross-sectional view taken along line III—III in FIG. 2.

For instance, as shown in FIGS. 2 and 3, a protector tube 108 made of fluororesin can be superposed on the inner surface of the isolating member 28.

Figure 4:
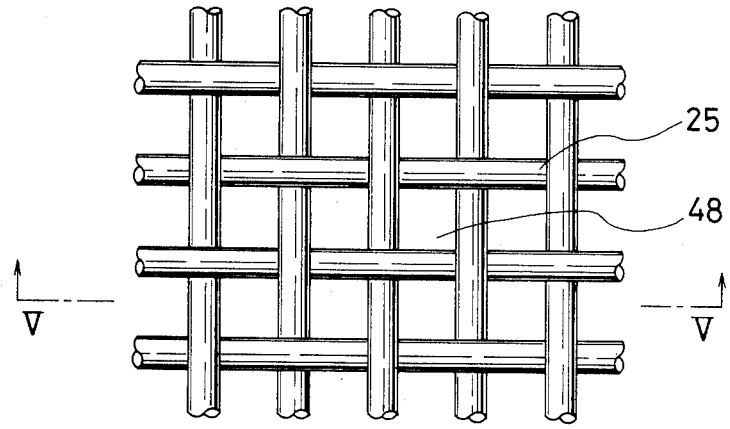
FIG. 4 is an enlarged plan view of a part of a wire net cylinder to be used according to the present invention.
Figure 5:
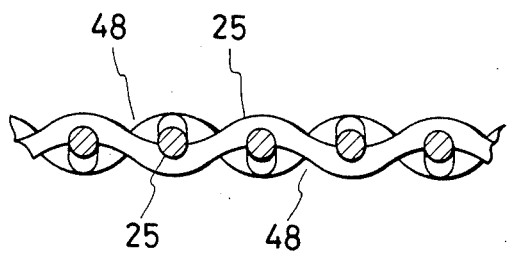
FIG. 5 is a cross-sectional view taken along line V—V in FIG. 4.
Figure 6:
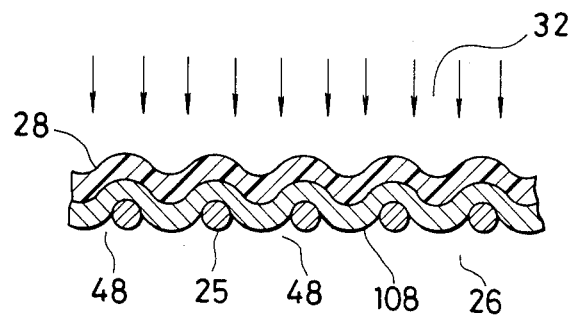
FIG. 6 is a partial cross-sectional view showing the state of use of the wire net portion in FIGS. 4 and 5.
Figure 10:
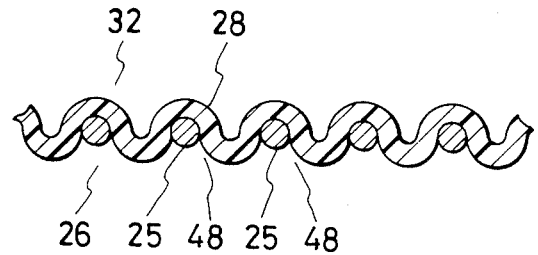
FIG. 10 is a partial cross-sectional view showing the state of use of the wire net portion in the prior art structure in FIG. 9.

When the pressure of the liquid within liquid chamber 26 reaches the limit of lowering, isolating member 28 is strongly pressed against the outside of the wire net cylinder 25 and deformed into a configuration swelling out of the meshes 48 of wire net 25 (See FIG. 4). If protector tube 108 is not present, as shown in FIG. 10, isolating member 28 having a large ductility and a large malleability will swell out extremely through the meshes 48 of wire net 25, resulting in damage and rupture of isolating member 28. When protector tube 108 is superposed on the inner surface of isolating member 28, as shown in FIG. 6, the deformation of isolating member 28 is mitigated and damage and rupture of the isolating member are prevented.

Accordingly, it is unnecessary to make the meshes of the wire net fine for the purpose of preventing damage and rupture of the isolating member, and there is no need to consider the problem of fluid resistance caused by fine meshes. Therefore, it is possible to coincide protection of an isolating member with improvements in response of an accumulator.

During contraction of isolating member 28, the guide frames 27 support isolating member 28 as shown in FIG. 3, so that isolating member 28 may not block all the communication holes 24 drilled around inner tube 22. More particularly, when isolating member 28 deforms from the position shown by solid lines to the position shown by dash-dot lines in FIG. 3, the communication holes drilled in the proximities of guide frames 27 will remain open and will not be blocked. Since isolating member 28 deforms into the shape depicted on the dash-dot lines, irregular deformation associated with complex creases will not arise, and damage and rupture of the isolating member will be prevented.

As shown in FIG. 2, a second protector tube 108A made of a thin fluororesin sheet and having a large number of small holes 107 may be placed outside wire net 25. This prevents wear of isolating member 28 caused by rubbing when isolating member 28 is directly pressed against or disengaged from the surface of wire net cylinder 25.

It is to be noted that in FIGS. 2 and 3, members given like reference numerals to those shown in FIG. 1 have the same member names and functions.

Figure 7:
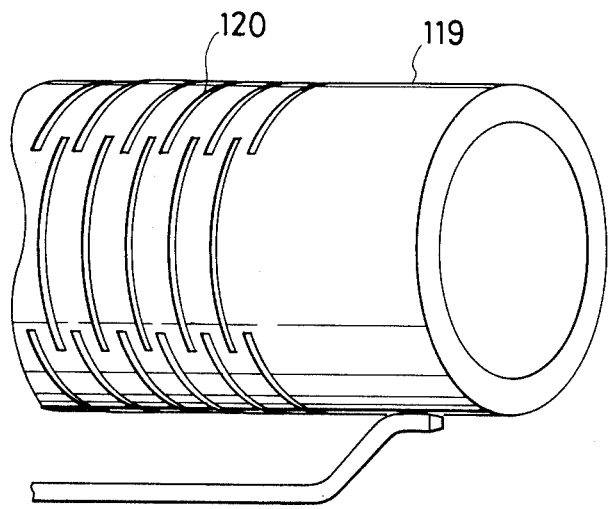
FIG. 7 is a perspective view showing a modified embodiment of a part of the structure according to the present invention.
Figure 8:
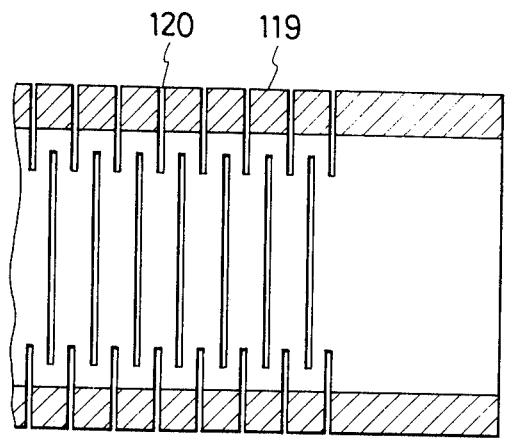
FIG. 8 is a longitudinal cross-sectional view of the same part.
Figure 9:
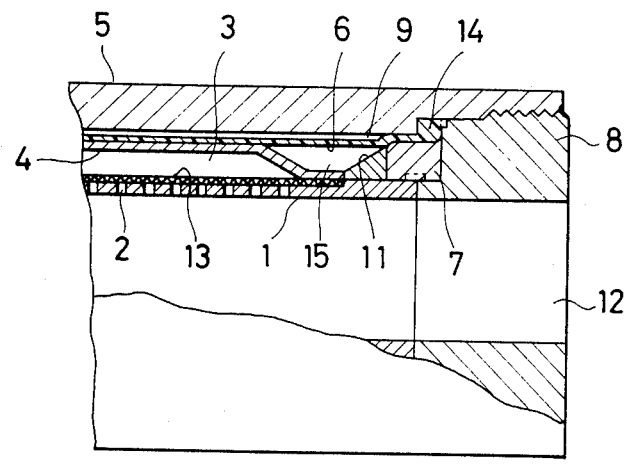
FIG. 9 is a longitudinal cross-sectional view showing one example of an in-line type accumulator in the prior art.

Alternatively, the structure in which wire net 25 is provided around the outer circumference of communication holes 24 of inner tube 22 can be replaced by an inner tube 119 with slits 120 as shown in FIGS. 7 and 8.

What is claimed is:

1. An isolating member in an in-line type accumulator of the type which comprises a pressure vessel containing a cylindrical non-pleated isolating member concentric with an inner tube having communication holes and a plurality of circumferentially spaced guide frames outstanding from the central portion of said inner tube and an isolating member cap to retain the isolating member at each end, said isolating member cap including slanted circumferential surfaces wherein said isolating member has a single central portion and opposite flanged end portions on both sides of said central portion, said central portion and flanged portions being of substantially equal diameter, said central portion being preformed to a diameter larger than said inner tube, portions of said isolating member between said flanges and central portion being formed smoothly to a constricted size substantially to lay against said inner tube and the slanted surface when said isolating member is in its natural state to minimize deformation strain during operation adjacent the flanged ends of the isolating member.

2. An isolating member in an in-line type accumulator as claimed in claim 1 wherein said central portion of said isolating member is of cylindrical shape.

3. An isolating member in an in-line type accumulator as claimed in claim 1 wherein said isolating member is made of rubber.

4. An isolating member in an in-line type accumulator as claimed in claim 1 wherein said isolating member is supported from the inside thereof by means of a number of guide frames.

* * * * *